US012668211B2

(12) United States Patent
Lee

(10) Patent No.: US 12,668,211 B2
(45) Date of Patent: Jun. 30, 2026

(54) WIPER SYSTEM FOR SENSOR CLEANING

(71) Applicant: DY AUTO CORPORATION, Asan-si (KR)

(72) Inventor: Jeong Goo Lee, Asan-si (KR)

(73) Assignee: DY AUTO CORPORATION, Chungcheongnam-Do (KR)

( * ) Notice: Subject to any disclaimer, the term of this patent is extended or adjusted under 35 U.S.C. 154(b) by 301 days.

(21) Appl. No.: 18/658,210

(22) Filed: May 8, 2024

(65) Prior Publication Data

US 2024/0383447 A1 Nov. 21, 2024

(30) Foreign Application Priority Data

May 15, 2023 (KR) ........................ 10-2023-0062521

(51) Int. Cl.
B60S 1/56 (2006.01)
B60S 1/34 (2006.01)
B60S 1/38 (2006.01)

(52) U.S. Cl.
CPC ................ B60S 1/566 (2013.01); B60S 1/34 (2013.01); B60S 1/38 (2013.01)

(58) Field of Classification Search
CPC .... B60S 1/566; B60S 1/34; B60S 1/38; B60S 1/3406; B60S 1/3427; B60S 1/3436; B60S 1/345; B60S 1/3447
See application file for complete search history.

(56) References Cited

U.S. PATENT DOCUMENTS 3,404,423 A * 10/1968 Howard ................ B60S 1/3406
                                            15/250.23
3,418,678 A * 12/1968 Deibel .................. B60S 1/4074
                                            15/250.23
3,600,739 A * 8/1971 Mower ..................... B60S 1/42
                                            15/250.32
(Continued)

FOREIGN PATENT DOCUMENTS

DE     102017128803 A1 * 6/2019 ............ B60S 1/3415
DE     102018219117 A1 * 5/2020 ............ B60S 1/3409
(Continued)

OTHER PUBLICATIONS

Notice of Allowance_KR 23-62521_Oct. 25, 2023_EN, Oct. 25, 2023.
Notice of Non-Final Rejection_KR 23-62521_Jul. 7, 2023_EN, Jul. 7, 2023.

*Primary Examiner* — Eret C Mcnichols
(74) *Attorney, Agent, or Firm* — Perman & Green, LLP

(57) ABSTRACT

A wiper system for sensor cleaning includes a frame, a window member coupled to the frame, a pivot shaft arranged on an outer side of the window member, a cantilever-shaped head fixed to the pivot shaft, a retainer rotatably coupled to the head within a certain angle, a blade holder rotatably coupled to an end portion of the retainer, a wiper blade detachably installed on the blade holder, and a pantograph arm including an end and another end, the end being rotatably coupled to the blade holder with respect to a second reference shaft spaced apart from the first reference shaft in parallel with the first reference shaft, and the other end being arranged at a position eccentric by a certain distance from the pivot shaft and rotatably coupled to the frame with respect to a third reference shaft parallel with the second reference shaft.

8 Claims, 7 Drawing Sheets

(56)                    References Cited

U.S. PATENT DOCUMENTS

| | | | | |
|---|---|---|---|---|
| 3,688,334 A * | 9/1972 | Peterson | ............... | B60S 1/3409 |
| | | | | 15/250.21 |
| 4,208,759 A * | 6/1980 | Nixon | ................... | B60S 1/3406 |
| | | | | 15/250.32 |
| 5,363,531 A * | 11/1994 | Chevrier | ................. | B60S 1/522 |
| | | | | 15/250.04 |
| 11,351,966 B2 * | 6/2022 | Shepherd | .............. | B60S 1/3404 |
| 11,738,717 B2 * | 8/2023 | Jablecki | ............... | B60S 1/3409 |
| | | | | 15/250.32 |
| 11,897,435 B1 * | 2/2024 | Herse | ................... | B60S 1/3406 |
| 2005/0242611 A1 * | 11/2005 | Weind | .................... | B60S 1/522 |
| | | | | 296/96.15 |
| 2022/0105901 A1 * | 4/2022 | Jablecki | ............... | B60S 1/3409 |
| 2022/0234547 A1 | 7/2022 | Lee | | |
| 2022/0410845 A1 | 12/2022 | Hegyi et al. | | |
| 2023/0057122 A1 | 2/2023 | Stefani | | |
| 2025/0263047 A1 * | 8/2025 | Jean | ...................... | B60S 1/3406 |

FOREIGN PATENT DOCUMENTS

| | | | | | |
|---|---|---|---|---|---|
| EP | 2821297 A2 * | 1/2015 | ........... | B60S 1/3404 |
| FR | 3028471 A1 * | 5/2016 | ........... | B60S 1/3447 |
| FR | 3039110 A1 * | 1/2017 | ........... | B60S 1/3409 |
| JP | 05014961 | 2/1993 | | |
| JP | 08104204 | 4/1996 | | |
| JP | 2010052538 | 3/2010 | | |
| JP | 5886256 | 3/2016 | | |
| JP | 2023512326 | 3/2023 | | |
| KR | 102301660 | 9/2021 | | |
| KR | 102519400 | 4/2023 | | |
| WO | WO-2007093547 A1 * | 8/2007 | ........... | B60S 1/3406 |

* cited by examiner

WIPER SYSTEM FOR SENSOR CLEANING

CROSS-REFERENCE TO RELATED APPLICATION

This application is based on and claims priority under 35 U.S.C. § 119 to Korean Patent Application No. 10-2023-0062521, filed on May 15, 2023, in the Korean Intellectual Property Office, the disclosure of which is incorporated by reference herein in its entirety.

BACKGROUND

1. Field

The disclosure relates to a wiper system for sensor cleaning, and for example, to a wiper system for cleaning the surface of a small lens installed on the exterior of a vehicle.

2. Description of the Related Art

An autonomous vehicle refers to a vehicle that recognizes the vehicle's external environment and the state of the driver without direct manipulation by the driver, makes a determination based on recognized information, and is controlled to autonomously travel to a destination.

The autonomous vehicle employs a plurality of sensor systems to recognize a surrounding situation on behalf of the driver. For example, sensors such as a camera, a lidar, and a radar are integrally installed on the autonomous vehicle. To enable the autonomous vehicle to recognize the situation in front of the vehicle, a camera sensor may be installed, for example, on the roof of the autonomous vehicle. An external lens of a sensor installed on the exterior of the vehicle may be contaminated by foreign substances such as dust or rain. When the lens is contaminated, the sensor may recognize wrong information or malfunction. When the sensor malfunctions or is unable to accurately recognize an external situation, this may lead to fatal accidents. However, it is difficult for sensor cleaning systems in the art to adopt a traditional vehicle's window wiper system. This is because window glass of a sensor system for an autonomous vehicle has a very small area. Thus, when the structure of a traditional wiper system is used, the window glass surface having the small area may not be cleaned sufficiently.

SUMMARY

Provided is a wiper system for sensor cleaning, in which a sensor lens surface having a small area may be effectively cleaned by improving a structure of the wiper system for sensor cleaning.

Additional aspects will be set forth in part in the description which follows and, in part, will be apparent from the description, or may be learned by practice of the presented embodiments of the disclosure.

A wiper system for sensor cleaning includes a frame including a sensor accommodation space with an open front, a window member coupled to the frame to transparently close the front of the sensor accommodation space, a pivot shaft arranged on an outer side of the window member, arranged in a direction perpendicular to the window member, and rotatably installed on the frame, a cantilever-shaped head of which one end is fixed to the pivot shaft, a retainer coupled to the other end of the head and installed to be rotatable with respect to a first hinge shaft within a certain angle with respect to the head, a blade holder rotatably coupled to an end portion of the retainer with respect to a first reference shaft arranged in a direction perpendicular to the first hinge shaft in space, a wiper blade detachably installed on the blade holder to clean a surface of the window member, and a pantograph arm including an end and another end, the end being rotatably coupled to the blade holder with respect to a second reference shaft spaced apart from the first reference shaft in parallel with the first reference shaft, and the other end being arranged at a position eccentric by a certain distance from the pivot shaft and rotatably coupled to the frame with respect to a third reference shaft parallel with the second reference shaft.

The retainer may include a portion parallel with a direction of an upper edge of the window member to avoid blocking a front of the window member at a parking position.

The pantograph arm may be disposed along an inner side of the retainer.

The blade holder may include a first coupling hole coupled to the first reference shaft and a second coupling hole coupled to the second reference shaft, and the frame may include a third coupling hole coupled to the third reference shaft.

The first coupling hole and the second coupling hole may be arranged symmetrically with each other in a width direction of the wiper blade.

The wiper system may further include a first bush coupled to the first coupling hole to reduce friction in rotation of the first reference shaft, a second bush coupled to the second coupling hole to reduce friction in rotation of the second reference shaft, and a third bush coupled to the third coupling hole to reduce friction in rotation of the third reference shaft.

The wiper blade may include a coupling hook in a central portion thereof, and the blade holder may include a second hinge shaft to which the coupling hook is coupled.

The blade holder may include a pair of guide rails guiding coupling of the coupling hook.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
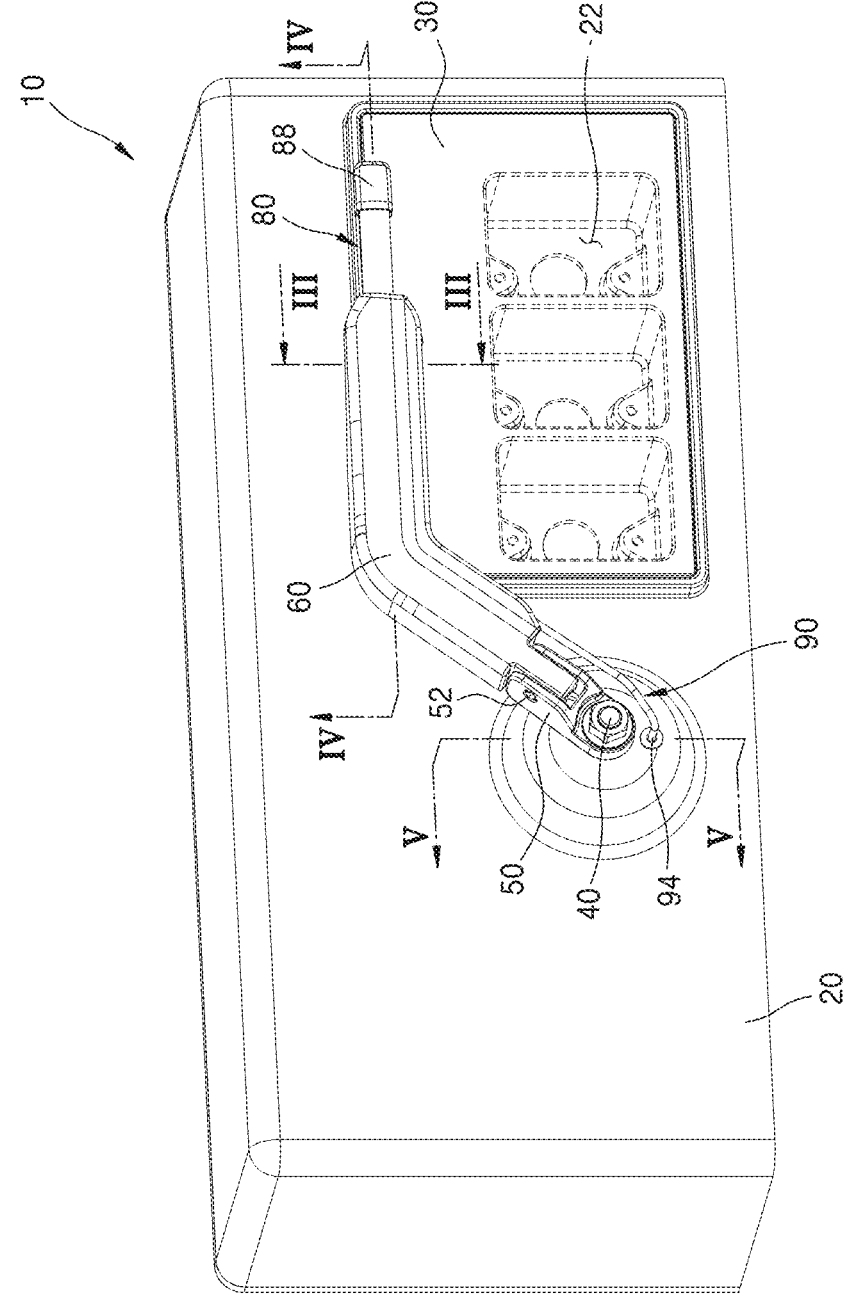
FIG. 1 is a main configuration diagram of a wiper system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, an embodiment will be described in more detail with reference to the accompanying drawings.

Figure 2:
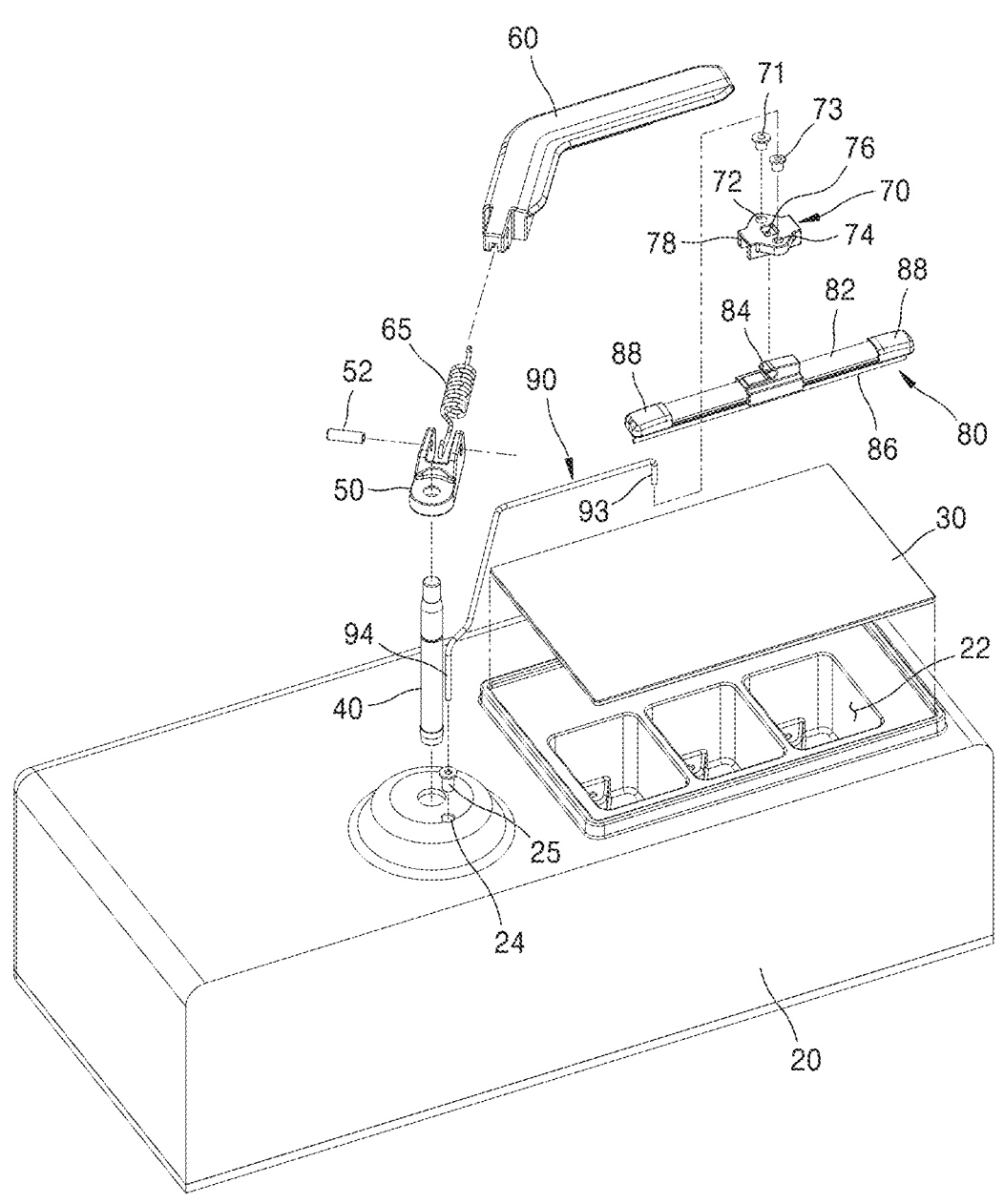
FIG. 2 is an exploded perspective view of main components of the wiper system shown in FIG. 1.
Figure 3:
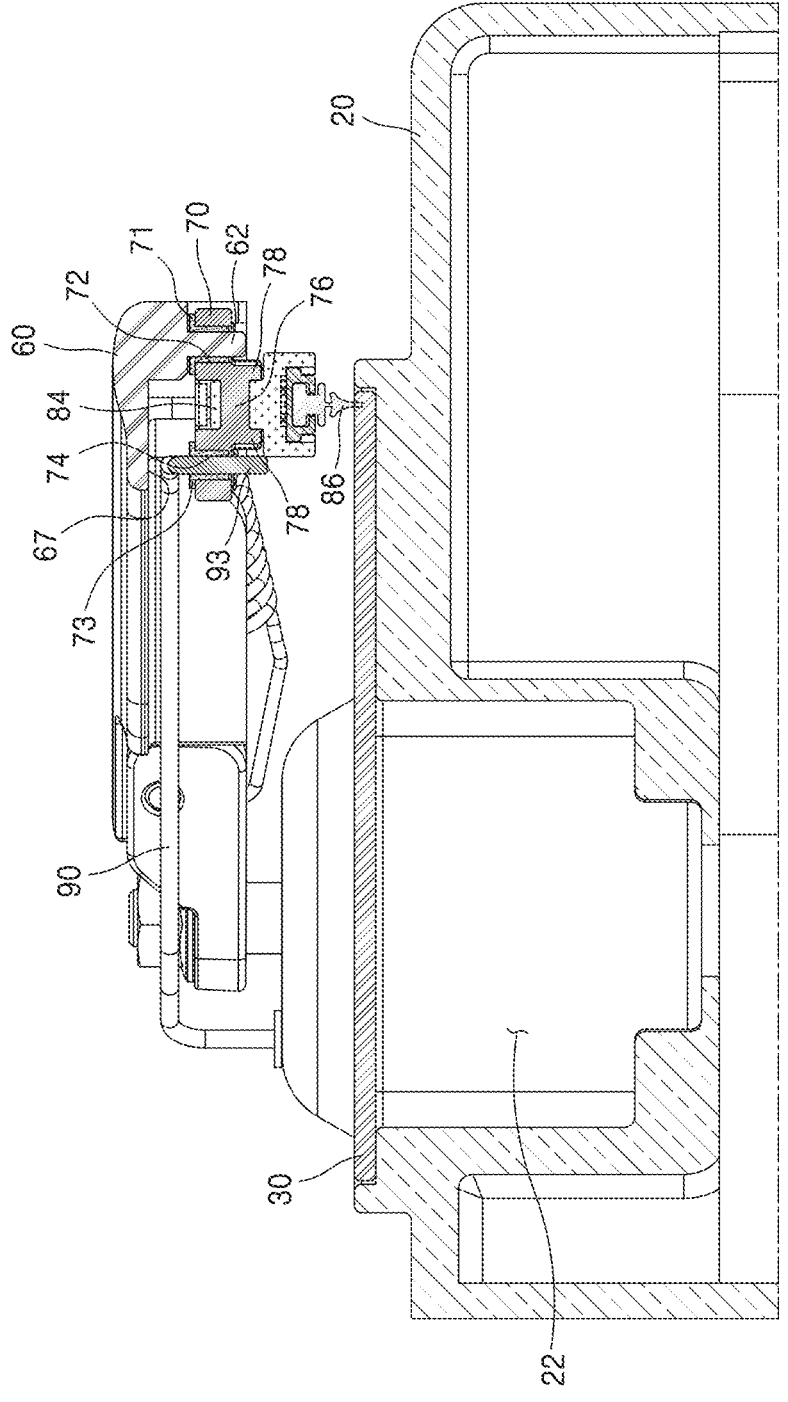
FIG. 3 is a cross-sectional view taken along a line III-III shown in FIG. 1.
Figure 4:
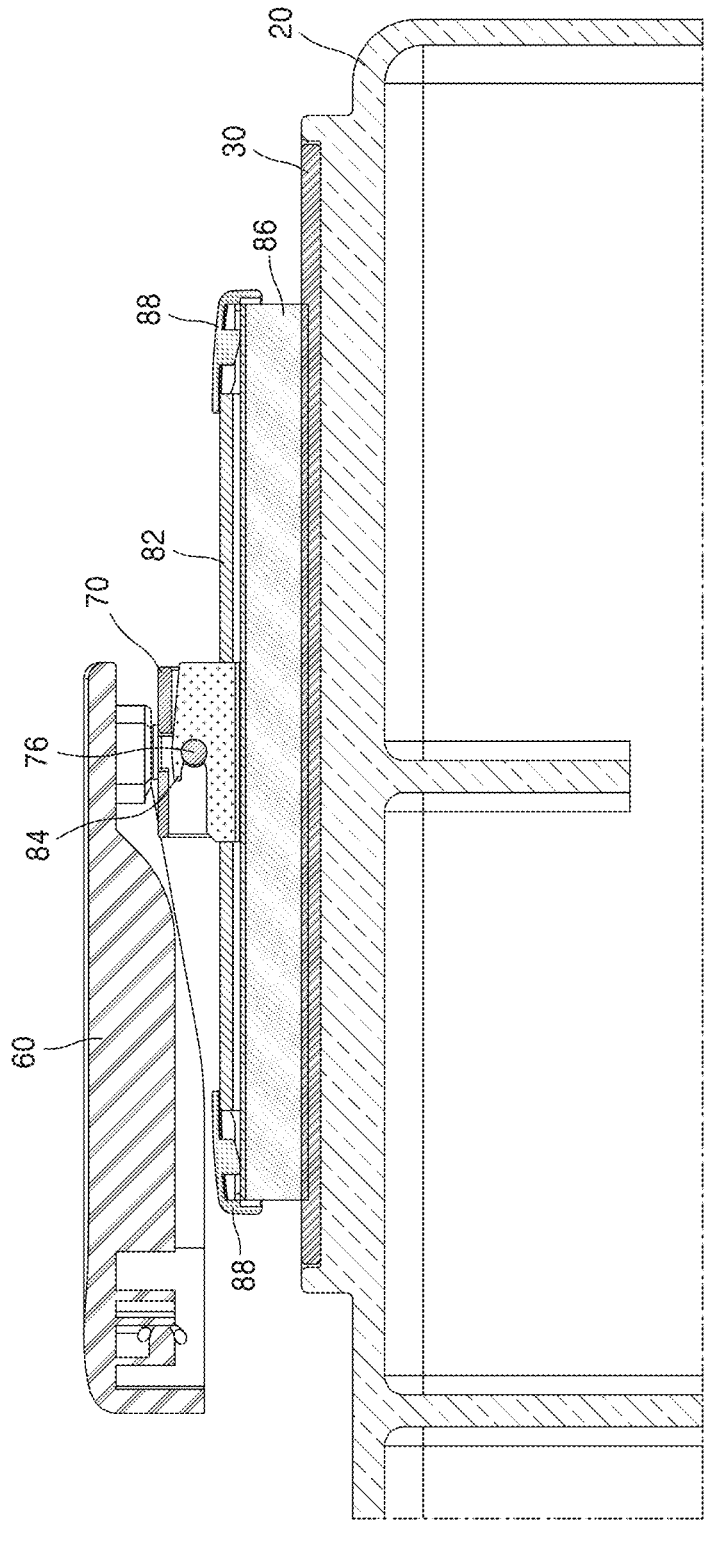
FIG. 4 is a cross-sectional view taken along a line IV-IV shown in FIG. 1.
Figure 5:
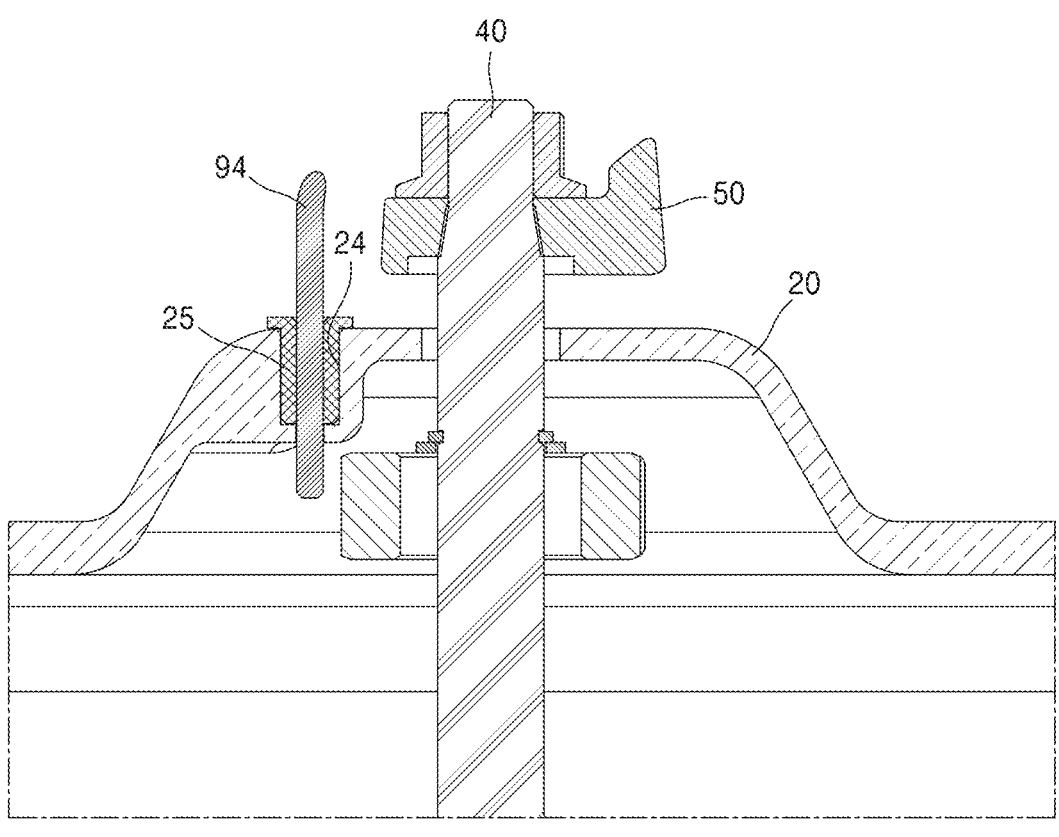
FIG. 5 is a cross-sectional view taken along a line V-V shown in FIG. 1.
Figure 6:
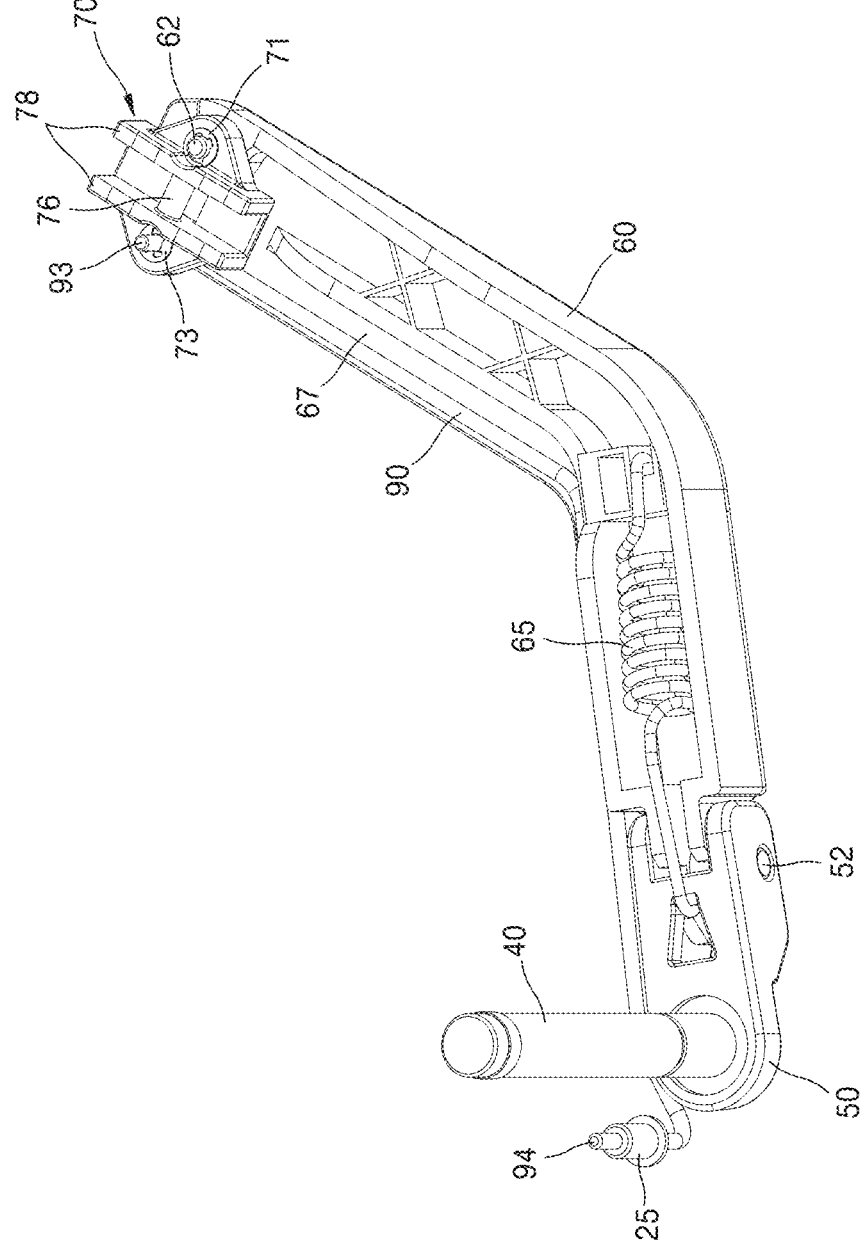
FIG. 6 is a view showing a lower arrangement structure of a retainer of the wiper system shown in FIG. 1.
Figure 7:
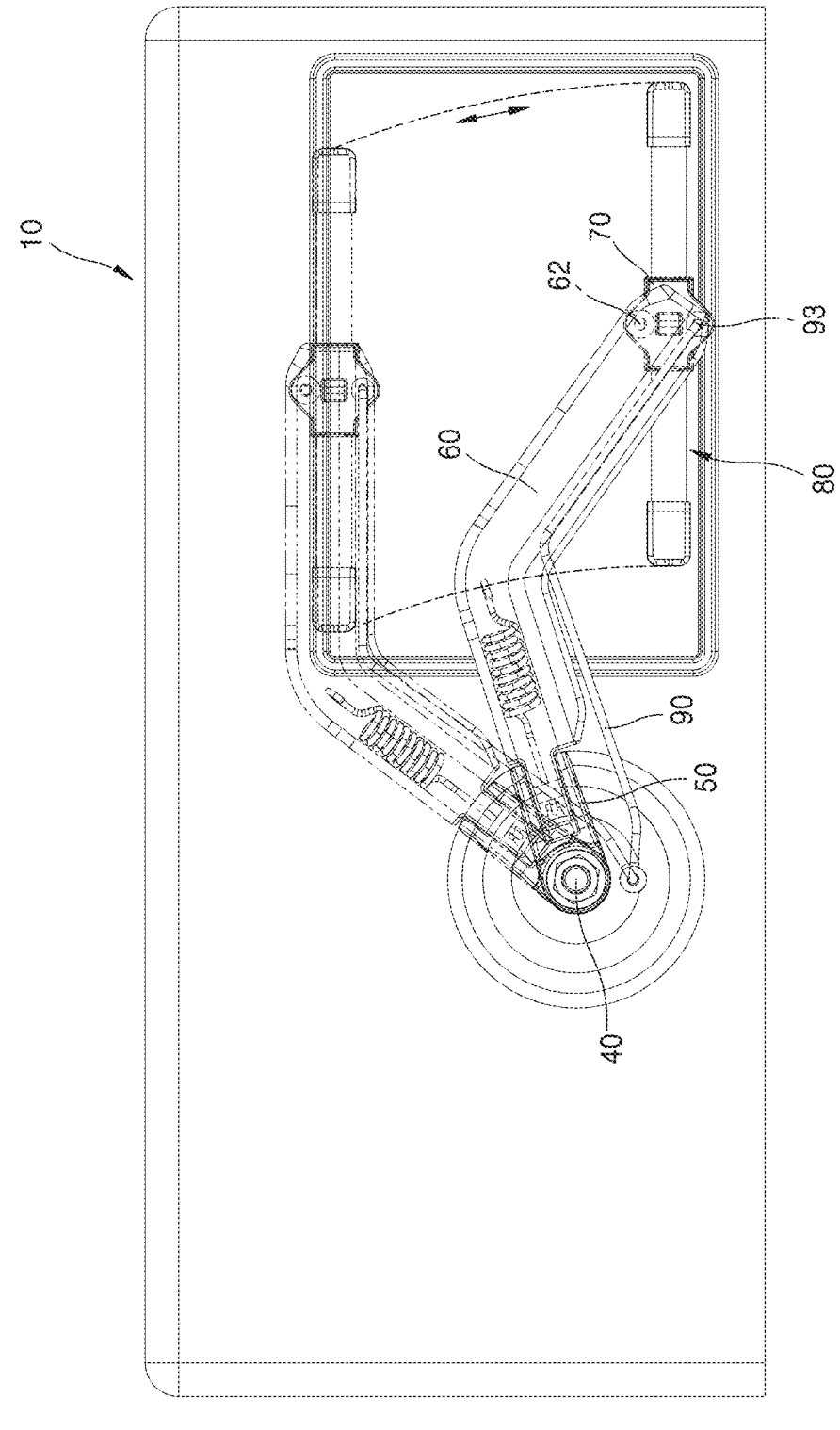
FIG. 7 is a view schematically showing a wiper blade trajectory in the wiper system shown in FIG. 1.

FIG. 1 is a main configuration diagram of a wiper system according to an embodiment. FIG. 2 is an exploded perspective view of main components of the wiper system shown in FIG. 1. FIG. 3 is a cross-sectional view taken along a line III-III shown in FIG. 1. FIG. 4 is a cross-sectional view taken along a line IV-IV shown in FIG. 1. FIG. 5 is a cross-sectional view taken along a line V-V shown in FIG. 1. FIG. 6 is a view showing a lower arrangement structure of a retainer of the wiper system shown in FIG. 1. FIG. 7 is a view schematically showing a wiper blade trajectory in the wiper system shown in FIG. 1.

Referring to FIGS. 1 to 7, a wiper system 10 for sensor cleaning (hereinafter, referred to as a "wiper system") according to an embodiment may include a frame 20, a window member 30, a pivot shaft 40, a head 50, a retainer 60, a pressing spring 65, a blade holder 70, a wiper blade 80, and a pantograph arm 90.

The frame 20 may include a sensor accommodation space 22 having an open front. A shape of the frame 20 may be various. The frame 20 may include synthetic resin or metal. A motor (not shown) may be installed inside the frame 20 to rotate a retainer 60, which will be described later, in a reciprocating manner. A plurality of sensors (not shown) may be installed in the sensor accommodation space 22. The sensor may be, for example, a camera, a lidar, a radar, etc. The frame 20 may include a third coupling hole 24. The third coupling hole 24 may be a hole into which a third reference shaft 94 formed at an end of a pantograph arm 90, which will be described later, is coupled. Meanwhile, the third coupling hole 24 may be provided in a member other than the frame 20. For example, the third coupling hole 24 may be provided in a housing of the motor. The third coupling hole 24 may include a third bush 25. The third bush 25 may be forcibly pressed into the third coupling hole 24. The third bush 25 may include synthetic resin.

The window member 30 may be a member arranged to transparently close the front of the sensor accommodation space 22. The window member 30 may include, for example, glass or transparent synthetic resin. The window member 30 may be coupled to the frame 20 by bonding or other methods. For example, the window member 30 may be a rectangular plate-shape structure.

The pivot shaft 40 may be arranged on an outer side of the window member 30. For example, the pivot shaft 40 may be arranged on any one of a lateral side, an upper side, and a lower side of the window member 30. The pivot shaft 40 may be rotatably installed on the frame 20 or a separate member. The pivot axis 40 may be arranged in a direction perpendicular to the window member 30. The pivot shaft 40 may be rotatably installed on the frame 20. The pivot shaft 40 may be rotated by the motor. The motor may be a direct current motor capable of forward and reverse rotation.

The head 50 may be a cantilever-shape structure with one end fixed to the pivot shaft 40. The head 50 may form a base of a wiper arm that moves a wiper blade 80, which will be described later. The retainer 60 may be coupled to the other end of the head 50 to be rotatable around a first hinge shaft 52.

The retainer 60 may be coupled to the other end of the head 50. The retainer 60 may be rotatably installed in a certain angle range with respect to the head 50 around the first hinge shaft 52. The pressing spring 65 may be installed between the retainer 60 and the head 50. The pressing spring 65 may be, for example, a tension coil spring. One end of the pressing spring 65 may be coupled to the head 50, and the other end of the pressing spring 65 may be coupled to the retainer 60. Accordingly, an elastic restoring force may be applied to the retainer 60 to rotate in a specific direction around the first hinge shaft 52. The restoring force generated by the pressing spring 65 may act in a direction to press the wiper blade 80 coupled to the retainer 60 toward the window member 30. It is desirable that the retainer 60 does not block the front of the window member 30 in a parking position. To this end, the retainer 60 may include a portion parallel to a top edge direction of the window member 30. For example, as shown in FIG. 1, the retainer 60 may have a bent shape in a middle portion thereof. The retainer 60 may include synthetic resin or metal. The first reference shaft 62 may be provided in an end portion of the retainer 60. The first reference shaft 62 may be arranged in a direction perpendicular to the first hinge shaft 52 in space. The first reference shaft 62 may be arranged parallel to the pivot shaft 40. The first reference shaft 62 may be formed integrally with the retainer 60. The first reference shaft 62 may be formed to protrude downwardly from a bottom surface of the retainer 60.

The blade holder 70 may be rotatably coupled to the end portion of the retainer 60. More specifically, the blade holder 70 may be installed to be rotatable around the first reference shaft 62. The first reference shaft 62 may be formed to pass through a top surface and a bottom surface of the blade holder 70. The first reference shaft 62 may be coupled to a first coupling hole 72 included in the blade holder 70. A first bush 71 may be installed in the first coupling hole 72. The first bush 71 may serve to reduce friction when the first reference shaft 62 rotates with respect to the blade holder 70. The first bush 71 may include synthetic resin. The first bush 71 may be forcibly pressed into the first coupling hole 72. In addition, the blade holder 70 may further include a second coupling hole 74, a second hinge shaft 76, and a guide rail 78.

The second coupling hole 74 may be a hole that passes through the top and bottom surfaces of the blade holder 70. The second coupling hole 74 may be formed at a position spaced apart from the first coupling hole 72. The second coupling hole 74 may be arranged symmetrically with the first coupling hole 72 in a width direction of the wiper blade 80. A second bush 73 may be installed in the second coupling hole 74. The second bush 73 may serve to reduce friction when a second reference shaft 93 formed on the pantograph arm 90 rotates with respect to the blade holder 70. The second bush 73 may include the same material as the first bush 71. The second bush 73 may be forcibly pressed into the second coupling hole 74.

The second hinge shaft 76 may be a shaft to which the wiper blade 80, which will be described later, is rotatably coupled. The second hinge shaft 76 may be formed in a central portion of the blade holder 70. The second hinge shaft 76 may be arranged in a direction perpendicular to the first reference shaft 62 in space. The second hinge shaft 76 may be formed integrally with the blade holder 70. A coupling hook 84 of the wiper blade 80, which will be described later, may be coupled to the second hinge shaft 76. A rectangular hole may be formed in a top portion of the second hinge shaft 76. The rectangular hole formed in the top portion of the second hinge shaft 76 may serve as an index enabling an operator to easily recognize that the coupling hook 84 is coupled to the second hinge shaft 76. In addition, the rectangular hole may be disposed in a direction in which the blade holder 70 is pulled out during injection molding, thereby improving the injection formability of the blade holder 70.

The guide rail 78 may be a pair of wall structures extending in a direction perpendicular to the second hinge shaft 76. The guide rail 78 may be provided symmetrically at both ends of the second hinge shaft 76. The guide rail 78 may serve to guide coupling of the coupling hook 84 in a process of coupling the wiper blade 80 to the blade holder 70.

The wiper blade 80 may be detachably installed on the blade holder 70. The wiper blade 80 may be a member that directly cleans the window member 30. The wiper blade 80 may contact a surface of the window member 30 to remove foreign substances on the surface of the window member 30. The wiper blade 80 may include a blade housing 82 and a wiper lip 86 coupled to the blade housing 82. End caps 88 may be installed on both ends of the wiper lip 86.

The coupling hook 84 may be provided in the central portion of the blade housing 82. The coupling hook 84 may be coupled to the second hinge shaft 76 provided on the blade holder 70.

The pantograph arm 90 may be a curved rigid structure. One end of the pantograph arm 90 may be rotatably coupled to the second coupling hole 74. A portion of the pantograph arm 90 coupled to the second coupling hole 74 may be defined as the second reference shaft 93. The second reference shaft 93 may be a structure integrated with the pantograph arm 90. The second reference shaft 93 may be arranged spaced apart from the first reference shaft 62 in parallel to the first reference shaft 62. The other end of the pantograph arm 90 may be rotatably coupled to the third coupling hole 24. A portion of the pantograph arm 90 coupled to the third coupling hole 24 may be defined as the third reference shaft 94. The third reference shaft 94 may be a structure integrated with the pantograph arm 90. The third reference shaft 94 may be arranged parallel to the pivot shaft 40. The third reference shaft 94 may be disposed at a position eccentric by a certain distance from the pivot shaft 40. The second reference shaft 93 and the third reference shaft 94 may be arranged in parallel with each other in space. The pantograph arm 90 may be disposed along an inner side of the retainer 60. When the retainer 60 has a bent shape, the pantograph arm 90 may also have a bent shape. The retainer 60 may include a roof structure 67 with one side wall open to prevent interference while the pantograph arm 90 moves.

As described above, one end of the pantograph arm 90 may be coupled to the blade holder 70. The other end of the pantograph arm 90 may be coupled to a position eccentric by a certain distance from the pivot shaft 40. Accordingly, the other end of the pantograph arm 90 may form a rotation center different from the pivot shaft 40. As a result, during the reciprocating rotation of the pivot shaft 40, the movement of the first reference shaft 62 and the trajectory of the second reference shaft 93 may be different from each other. The first reference shaft 62 may perform a reciprocating rotational movement with respect to the pivot shaft 40. The second reference shaft 93 may perform a reciprocating rotational movement with respect to the third reference shaft 94. Accordingly, the movement trajectory of the blade holder 70 to which the first reference shaft 62 and the second reference shaft 93 are coupled may be formed by cooperation of the rotation trajectory of the retainer 60 and the movement trajectory of the pantograph arm 90.

Hereinafter, the working effects of the wiper system 10 including the above-described components will be described in detail by taking an operation process of the wiper system 10 as an example.

Referring to FIG. 1, in an initial state, the retainer 60 may be at a parking position. The parking position may be configured to be located along the upper edge of the window member 30 such that the wiper blade 80 does not block the front of the window member 30. Now, upon detection of a foreign substance on the surface of the window member 30, cleaning may start. An electric signal may be applied to a wiper motor. The motor may operate. The pivot shaft 40 may rotate by the motor. The pivot shaft 40 may rotate in a clockwise direction. Accordingly, the head 50 may rotate in the clockwise direction. The retainer 60 may rotate integrally with the head 50. The blade holder 70 installed at the end portion of the retainer 60 may rotate. Thus, the wiper blade 80 may rotate integrally with the blade holder 70. Accordingly, the wiper blade 80 may clean the surface of the window member 30. In this process, the motor may rotate forward and reverse within a preset range such that the wiper blade 80 does not deviate from upper and lower ends of the window member 30. The retainer 60 may rotate with respect to the pivot shaft 40. However, the blade holder 70 in which the wiper blade 80 is installed may be installed on the retainer 60 to be rotatable with respect to the first reference shaft 62, and may be installed on the pantograph arm 90 to be rotatable with respect to the second reference shaft 93 spaced apart from the first reference shaft 62 by a certain distance and arranged in parallel with the first reference shaft 62. As the rotation center of the retainer 60 and the rotation center of the pantograph arm 90 are different from each other, the blade holder 70 may move along a trajectory in which the first reference shaft 62 and the second reference shaft 63 move in cooperation with each other. In this process, the wiper blade 80 may move a certain amount in the left and right directions of the window member 30. As shown in FIG. 7, the wiper blade 80 may move to the right while moving downwardly. Meanwhile, the wiper blade 80 may move to the left while moving upwardly. Accordingly, while the retainer 60 draws an arc around the pivot shaft 40, the wiper blade 80 may move closer to substantially a straight line in the vertical direction. Thus, the wiper blade 80 may wipe the window member 30 in the vertical direction along the trajectory closer to the straight line. In this way, as the wiper blade 80 moves to the left and right while moving up and down by the pantograph arm 90, an area cleaned by the wiper blade 80 may increase.

As described above, the wiper system for sensor cleaning according to the disclosure may be configured such that the movement trajectory of the retainer rotated by the pivot shaft is different from the movement trajectory of the pantograph arm rotated around the third reference shaft different from the pivot shaft, the wiper blade moving by the cooperative action of the retainer and the pantograph arm may maximize the cleaning area of the window member, thereby efficiently cleaning the surface of a small lens applied to the sensor.

So far, the present disclosure has been described in detail with preferred embodiments, but the present disclosure is not limited to the above embodiments, and it may be apparent that many variations are possible within the technical spirit of the present disclosure by those of ordinary skill in the art.

The wiper system for sensor cleaning according to the disclosure may be configured such that the movement trajectory of the retainer rotated by the pivot shaft is different from the movement trajectory of the pantograph arm rotated around the third reference shaft different from the pivot shaft, the wiper blade moving by the cooperative action of the retainer and the pantograph arm may maximize the cleaning area of the window member, thereby efficiently cleaning the surface of a small lens applied to the sensor.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A wiper system for sensor cleaning, comprising:
a frame comprising a sensor accommodation space with an open front;
a window member coupled to the frame to transparently close the front of the sensor accommodation space;
a pivot shaft arranged on an outer side of the window member, arranged in a direction perpendicular to the window member, and rotatably installed on the frame;
a cantilever-shaped head of which one end is fixed to the pivot shaft;
a retainer coupled to the other end of the head and installed to be rotatable with respect to a first hinge shaft within a certain angle with respect to the head;
a blade holder rotatably coupled to an end portion of the retainer with respect to a first reference shaft arranged in a direction perpendicular to the first hinge shaft in space;
a wiper blade detachably installed on the blade holder to clean a surface of the window member; and
a pantograph arm comprising an end and another end, the end being rotatably coupled to the blade holder with respect to a second reference shaft spaced apart from the first reference shaft in parallel with the first reference shaft, and the other end being arranged at a position eccentric by a certain distance from the pivot shaft and rotatably coupled to the frame with respect to a third reference shaft parallel with the second reference shaft,
wherein the first reference shaft is a structure formed integrally with the retainer,
the second reference shaft and the third reference shaft are structures formed integrally with the pantograph arm, and
the retainer forms a roof structure with an open side wall to prevent interference in a process of movement of the pantograph arm.

2. The wiper system of claim 1, wherein the retainer comprises a portion parallel with a direction of an upper edge of the window member to avoid blocking a front of the window member at a parking position.

3. The wiper system claim 1, wherein the pantograph arm is arranged along an inner side of the retainer.

4. The wiper system of claim 1, wherein the blade holder comprises:
a first coupling hole coupled to the first reference shaft; and
a second coupling hole coupled to the second reference shaft, and
the frame comprises a third coupling hole coupled to the third reference shaft.

5. The wiper system of claim 4, wherein the first coupling hole and the second coupling hole are arranged symmetrically with each other in a width direction of the wiper blade.

6. The wiper system of claim 4, further comprising:
a first bush coupled to the first coupling hole to reduce friction in rotation of the first reference shaft;
a second bush coupled to the second coupling hole to reduce friction in rotation of the second reference shaft; and
a third bush coupled to the third coupling hole to reduce friction in rotation of the third reference shaft.

7. The wiper system of claim 1, wherein the wiper blade comprises a coupling hook in a central portion thereof, and
the blade holder comprises a second hinge shaft to which the coupling hook is coupled.

8. The wiper system of claim 7, wherein the blade holder comprises a pair of guide rails guiding coupling of the coupling hook.

* * * * *